(12) United States Patent
Matsen et al.

(10) Patent No.: US 8,556,619 B2
(45) Date of Patent: *Oct. 15, 2013

(54) COMPOSITE FABRICATION APPARATUS

(75) Inventors: Marc R. Matsen, Seattle, WA (US); Kim E. Peterson, Bellevue, WA (US); William Dykstra, Rockford, MI (US)

(73) Assignee: The Boeing Company, Chicago, IL (US)

( * ) Notice: Subject to any disclaimer, the term of this patent is extended or adjusted under 35 U.S.C. 154(b) by 13 days.

This patent is subject to a terminal disclaimer.

(21) Appl. No.: 13/177,403

(22) Filed: Jul. 6, 2011

(65) Prior Publication Data

US 2011/0262575 A1    Oct. 27, 2011

Related U.S. Application Data

(62) Division of application No. 11/854,733, filed on Sep. 13, 2007, now Pat. No. 8,017,059.

(51) Int. Cl.
*B29C 35/00* (2006.01)
*B21D 37/16* (2006.01)

(52) U.S. Cl.
USPC .......... 425/407; 249/78; 249/80; 249/135; 249/115; 249/116; 264/320; 264/327; 264/403; 72/342.5; 72/342.92

(58) Field of Classification Search
USPC .......... 249/78–81, 114.1–115, 134–135; 425/407, 547; 264/319, 320, 327, 403; 72/60, 342.3–342.5, 342.7, 342.92, 72/342.94
See application file for complete search history.

(56) References Cited

U.S. PATENT DOCUMENTS

| | | | |
|---|---|---|---|
| 1,910,015 A | 5/1933 | Homand | |
| 2,106,614 A | 1/1938 | Lindner | |
| 2,317,597 A | 4/1943 | Ford et al. | |
| 2,993,786 A | 7/1961 | Roboff et al. | |
| 3,413,392 A | 11/1968 | Meadows | |
| 3,454,685 A | 7/1969 | Roy et al. | |
| 3,650,042 A | 3/1972 | Boerger et al. | |
| 3,763,293 A | 10/1973 | Nussbaum | |
| 4,182,397 A * | 1/1980 | Schmucker et al. | 164/443 |

(Continued)

FOREIGN PATENT DOCUMENTS

| | | |
|---|---|---|
| FR | 2696676 A1 | 4/1994 |
| GB | 2430177 A | 3/2007 |
| WO | 2009036473 A2 | 3/2009 |
| WO | 2011115716 A1 | 9/2011 |

OTHER PUBLICATIONS

USPTO Office Action for U.S. Appl. No. 11/854,733 dated Aug. 17, 2009.

(Continued)

*Primary Examiner* — Dimple Bodawala
(74) *Attorney, Agent, or Firm* — Yee & Associates, P.C.

(57) ABSTRACT

A composite fabrication apparatus which may include a first tooling die and a second tooling die movable with respect to each other; a thermal control system having induction coils disposed in thermal contact with the first tooling die and the second tooling die; a first die susceptor provided on the first tooling die and a second die susceptor provided on the second tooling die and connected to the induction coils; and a cooling system disposed in thermal contact with the first tooling die and the second tooling die. A composite fabrication method is also disclosed.

19 Claims, 5 Drawing Sheets

(56) References Cited

U.S. PATENT DOCUMENTS

| | | | |
|---|---|---|---|
| 4,217,325 A | 8/1980 | Colby | |
| 4,327,045 A * | 4/1982 | Nishikawa et al. | 264/51 |
| 4,527,970 A | 7/1985 | Murley | |
| 4,596,694 A | 6/1986 | Rozmus | |
| 4,597,730 A | 7/1986 | Rozmus | |
| 4,636,341 A | 1/1987 | Murley | |
| 4,683,018 A | 7/1987 | Sutcliffe et al. | |
| 4,724,123 A | 2/1988 | Rozmus, Jr. | |
| 4,761,262 A | 8/1988 | Ogata et al. | |
| 4,940,563 A | 7/1990 | Kromrey | |
| 4,983,341 A | 1/1991 | Kromrey | |
| 4,983,345 A | 1/1991 | Kromrey | |
| 5,009,687 A | 4/1991 | Kromrey | |
| 5,049,053 A | 9/1991 | Tabaru | |
| 5,049,329 A | 9/1991 | Allaire et al. | |
| 5,064,597 A * | 11/1991 | Kim | 264/219 |
| 5,188,692 A * | 2/1993 | Horvath | 156/212 |
| 5,225,015 A | 7/1993 | Allaire et al. | |
| 5,338,372 A | 8/1994 | Tabaru | |
| 5,338,497 A | 8/1994 | Murray et al. | |
| 5,410,132 A | 4/1995 | Gregg et al. | |
| 5,413,661 A | 5/1995 | Spengler et al. | |
| 5,483,043 A * | 1/1996 | Sturman et al. | 219/647 |
| 5,529,479 A * | 6/1996 | Souders | 425/384 |
| 5,530,227 A | 6/1996 | Matsen et al. | |
| 5,591,369 A | 1/1997 | Matsen et al. | |
| 5,591,370 A | 1/1997 | Matsen et al. | |
| 5,592,988 A | 1/1997 | Meroni et al. | |
| 5,599,472 A | 2/1997 | Brown et al. | |
| 5,645,744 A | 7/1997 | Matsen et al. | |
| 5,683,608 A | 11/1997 | Matsen et al. | |
| 5,705,794 A | 1/1998 | Gillespie et al. | |
| 5,728,309 A | 3/1998 | Matsen et al. | |
| 5,747,179 A | 5/1998 | Matsen et al. | |
| 5,772,946 A | 6/1998 | Kaminaga et al. | |
| 5,808,281 A | 9/1998 | Matsen et al. | |
| 5,885,504 A | 3/1999 | David et al. | |
| 5,989,008 A * | 11/1999 | Wytkin | 425/432 |
| 6,040,563 A | 3/2000 | Matsen et al. | |
| 6,149,844 A * | 11/2000 | Graham | 264/71 |
| 6,211,497 B1 | 4/2001 | Matsen et al. | |
| 6,221,813 B1 | 4/2001 | Riedel et al. | |
| 6,283,195 B1 | 9/2001 | Chandley et al. | |
| 6,284,089 B1 | 9/2001 | Anderson et al. | |
| 6,299,819 B1 | 10/2001 | Han | |
| 6,310,327 B1 | 10/2001 | Moore et al. | |
| 6,524,511 B1 | 2/2003 | Ueki et al. | |
| 6,528,771 B1 | 3/2003 | Matsen et al. | |
| 6,529,796 B1 | 3/2003 | Kroeger et al. | |
| 6,565,792 B2 | 5/2003 | Hemphill | |
| 6,565,942 B2 | 5/2003 | Anderson et al. | |
| 6,566,635 B1 | 5/2003 | Matsen et al. | |
| 6,653,608 B1 | 11/2003 | Matsen et al. | |
| 6,747,253 B1 | 6/2004 | Firth et al. | |
| 6,812,271 B2 | 11/2004 | Swartz et al. | |
| 6,840,750 B2 | 1/2005 | Thrash et al. | |
| 6,855,917 B2 * | 2/2005 | Matsen et al. | 219/659 |
| 6,884,966 B2 | 4/2005 | Coleman et al. | |
| 6,897,419 B1 * | 5/2005 | Brown et al. | 219/634 |
| 6,906,300 B2 | 6/2005 | Brown et al. | |
| 6,914,225 B2 | 7/2005 | Fischer et al. | |
| 6,979,807 B2 | 12/2005 | Anderson et al. | |
| 6,991,446 B2 | 1/2006 | Byma et al. | |
| 7,024,897 B2 * | 4/2006 | Pfaffmann et al. | 72/60 |
| 7,037,465 B2 | 5/2006 | Ogawa | |
| 7,102,112 B2 | 9/2006 | Anderson et al. | |
| 7,109,451 B2 | 9/2006 | Brown et al. | |
| 7,159,836 B2 * | 1/2007 | Parks et al. | 249/155 |
| 7,269,986 B2 * | 9/2007 | Pfaffmann et al. | 72/60 |
| 7,351,054 B2 | 4/2008 | Bachan | |
| 7,419,631 B2 | 9/2008 | Guichard et al. | |
| 7,497,981 B2 | 3/2009 | Graham | |
| 7,866,969 B2 | 1/2011 | Ruiz et al. | |
| 7,905,128 B2 * | 3/2011 | Matsen et al. | 72/60 |
| 7,926,285 B2 | 4/2011 | Tisdale et al. | |
| 8,017,059 B2 * | 9/2011 | Matsen et al. | 264/403 |
| 8,343,402 B1 * | 1/2013 | Matsen et al. | 264/125 |
| 8,372,327 B2 * | 2/2013 | Matsen et al. | 264/258 |
| 8,375,758 B1 * | 2/2013 | Matsen et al. | 72/60 |
| 2002/0025423 A1 | 2/2002 | Dreher et al. | |
| 2002/0050667 A1 | 5/2002 | Swartz et al. | |
| 2002/0117238 A1 | 8/2002 | Krajewski | |
| 2002/0121721 A1 * | 9/2002 | Byma et al. | 264/112 |
| 2002/0157785 A1 | 10/2002 | Anderson et al. | |
| 2002/0167119 A1 | 11/2002 | Hemphill | |
| 2002/0185785 A1 | 12/2002 | Thrash et al. | |
| 2004/0058027 A1 * | 3/2004 | Guichard et al. | 425/174.6 |
| 2004/0101429 A1 | 5/2004 | Ogawa | |
| 2004/0113315 A1 * | 6/2004 | Graham | 264/266 |
| 2004/0194424 A1 | 10/2004 | Frost et al. | |
| 2005/0035116 A1 | 2/2005 | Brown et al. | |
| 2005/0045303 A1 | 3/2005 | Itoyama et al. | |
| 2005/0069600 A1 * | 3/2005 | Scolamiero et al. | 425/149 |
| 2005/0145309 A1 | 7/2005 | Coleman et al. | |
| 2005/0151555 A1 * | 7/2005 | Lewis et al. | 324/760 |
| 2005/0205568 A1 * | 9/2005 | Brown et al. | 219/759 |
| 2006/0102316 A1 | 5/2006 | Itoyama et al. | |
| 2006/0131473 A1 * | 6/2006 | Bachan | 249/79 |
| 2006/0233907 A1 | 10/2006 | Ruiz et al. | |
| 2007/0000602 A1 | 1/2007 | Sprague | |
| 2007/0160822 A1 | 7/2007 | Bristow et al. | |
| 2007/0241482 A1 | 10/2007 | Giller et al. | |
| 2009/0071217 A1 | 3/2009 | Matsen et al. | |
| 2009/0074905 A1 * | 3/2009 | Matsen et al. | 425/547 |
| 2011/0006460 A1 | 1/2011 | Vander Wel et al. | |
| 2011/0229720 A1 | 9/2011 | Matsen et al. | |
| 2013/0122764 A1 | 5/2013 | Matsen et al. | |

OTHER PUBLICATIONS

USPTO Final Office Action for U.S. Appl. No. 11/854,733 dated Mar. 1, 2010.

USPTO Office Action for U.S. Appl. No. 11/854,733 dated Jul. 19, 2010.

USPTO Final Office Action for U.S. Appl. No. 11/854,733 dated Feb. 1, 2011.

USPTO Notice of Allowance for U.S. Appl. No. 11/854,733 dated May 19, 2011.

USPTO Office Action for U.S. Appl. No. 11/859,098 dated Nov. 5, 2009.

USPTO Final Office Action for U.S. Appl. No. 11/859,098 dated May 25, 2010.

Notice of allowance dated Oct. 3, 2012 regarding U.S. Appl. No. 11/859,098, 21 pages.

International Search Report, dated Jun. 12, 2009, regarding Application No. PCT/US2008/077039 (WO2009036473), 5 pages.

International Search Report, dated Jun. 6, 2011, regarding Application No. PCT/US2011/024843 (WO2011115716), 3 pages.

Response to Office Action, dated Nov. 17, 2009, regarding U.S. Appl. No. 11/854,733, 22 pages.

Response to Final Office Action, dated Apr. 29, 2010, regarding U.S. Appl. No. 11/854,733, 20 pages.

Response to Office Action, dated Nov. 29, 2010, regarding U.S. Appl. No. 11/854,733, 19 pages.

Response to Final Office Action, dated Apr. 27, 2011, regarding U.S. Appl. No. 11/854,733, 12 pages.

Response to Office Action, dated Feb. 2, 2010, regarding U.S. Appl. No. 11/859,098, 19 pages.

Response to Final Office Action, dated Aug. 9, 2010, regarding U.S. Appl. No. 11/859,098, 23 pages.

USPTO Office Action, dated Dec. 22, 2011, regarding U.S. Appl. No. 11/859,098, 18 pages.

Response to Office Action, dated Mar. 22, 2012, regarding U.S. Appl. No. 11/859,098, 14 pages.

USPTO Office Action, dated Nov. 8, 2011, regarding U.S. Appl. No. 12/724,473, 15 pages.

USPTO Final Office Action, dated Mar. 29, 2012, regarding U.S. Appl. No. 12/724,473, 13 pages.

Matsen et al., "Consolidation of Composite Material," U.S. Appl. No. 12/625,354, filed Nov. 24, 2009, 37 pages.

(56) References Cited

OTHER PUBLICATIONS

Matsen et al., "Induction Forming of Metal Components with Integral Heat Treatment," U.S. Appl. No. 12/817,459, filed Jun. 17, 2010, 43 pages.

Matsen et al., "Induction Forming of Metal Components with Slotted Susceptors," U.S. Appl. No. 12/835,207, filed Jul. 13, 2010, 40 pages.

USPTO Notice of Allowance, dated Jun. 21, 2012, regarding U.S. Appl. No. 11/859,098, 8 pages.

Matsen et al., "Apparatus for Resin Transfer Molding Composite Parts," U.S. Appl. No. 13/722,670 and Preliminary Amendment, filed Dec. 20, 2012, 45 pages.

Office Action, dated May 29, 2012, regarding U.S. Appl. No. 12/625,354, 20 pages.

Notice of Allowance, dated Sep. 17, 2012, regarding U.S. Appl. No. 12/625,354, 8 pages.

Office Action, dated Sep. 28, 2012, regarding U.S. Appl. No. 12/817,459, 13 pages.

Notice of Allowance, dated Mar. 11, 2013, regarding U.S. Appl. No. 12/817,459, 8 pages.

Notice of Allowance, dated Jun. 26, 2012, regarding U.S. Appl. No. 12/835,207, 10 pages.

\* cited by examiner

COMPOSITE FABRICATION APPARATUS

This application is a divisional application of U.S. application Ser. No. 11/854,733, filed Sep. 13, 2007, now issued as U.S. Pat. No. 8,017,059 issued on Sep. 19, 2011; and this application claims priority therefrom.

BACKGROUND INFORMATION

1. Field

The disclosure relates to composite fabrication apparatus and methods. More particularly, the disclosure relates to a composite fabrication apparatus and method which optimizes performance of a composite material fabricated according to the method.

2. Background

Processing techniques and facilities which enable widespread use of molded thermoplastic composite components at production rates and production costs and that allow significant weight savings scenarios may be desirable in some applications. The capability to rapidly heat, consolidate and cool in a controlled manner may be required for high production rates of composite components. Current processing techniques include the use of heated dies, and therefore, may not allow for the optimum controlled cool-down which may be required for optimum fabrication. Furthermore, current processing techniques may have limitations in forming the desired components since such techniques have limitations in the capability to hold the dimensions of the component accurately or maintain the composite in a fully consolidated state and may not optimize performance of the current resin systems.

SUMMARY

The disclosure is generally directed to a composite fabrication apparatus. An illustrative embodiment of the composite fabrication apparatus may include a first tooling die and a second tooling die movable with respect to each other; a first contoured surface provided on the first tooling die and a second contoured surface provided on the second tooling die; a thermal control system having induction coils disposed in thermal contact with the first tooling die and the second tooling die; a first die susceptor provided on the first contoured surface of the first tooling die and a second die susceptor provided on the second contoured surface of the second tooling die and connected to the induction coils; and a cooling system disposed in thermal contact with the first tooling die and the second tooling die.

The disclosure is further generally directed to a composite fabrication method. An illustrative embodiment of the composite fabrication method includes providing a stacked tooling apparatus comprising a first tooling die and a second tooling die; placing molding compounds between the first tooling die and the second tooling die; heating the first tooling die and the second tooling die; moving the first tooling die and the second tooling die into contact with the composite sheet; cooling the first tooling die and the second tooling die; and removing a molded composite sheet from between the first tooling die and the second tooling die.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
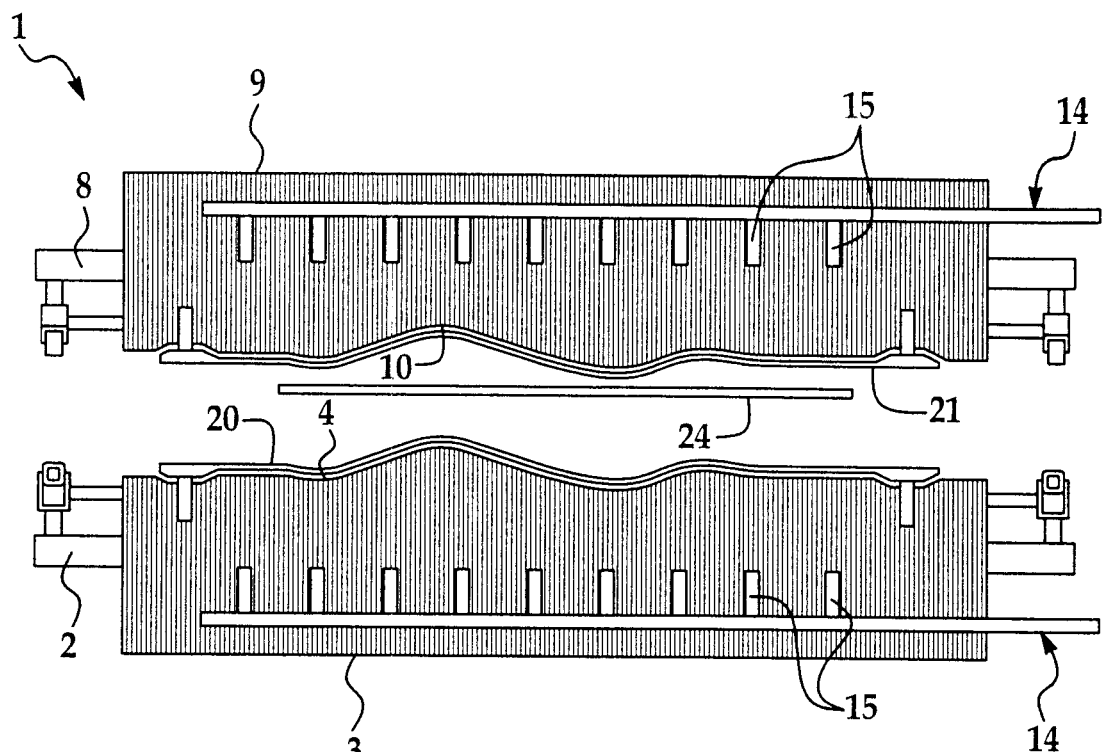
FIG. 1 is a sectional view of a pair of tooling dies of a stacked tooling apparatus, with molding compounds positioned between the tooling dies.

Referring initially to FIGS. 1-7 of the drawings, a stacked tooling apparatus which is suitable for implementation of the composite fabrication method is generally indicated by reference numeral 1. The stacked tooling apparatus 1 may include a first die frame 2 and a second die frame 8. A first tooling die 3 may be provided on the first die frame 2, and a second tooling die 9 may be provided on the second die frame 8. The first tooling die 3 and the second tooling die 9 may be hydraulically-actuated to facilitate movement of the first tooling die 3 and the second tooling die 9 toward and away from each other. The first tooling die 3 may have a first contoured die surface 4, whereas the second tooling die 9 may have a second contoured die surface 10 which is complementary to the first contoured die surface 4 of the first tooling die 3.

Figure 5:
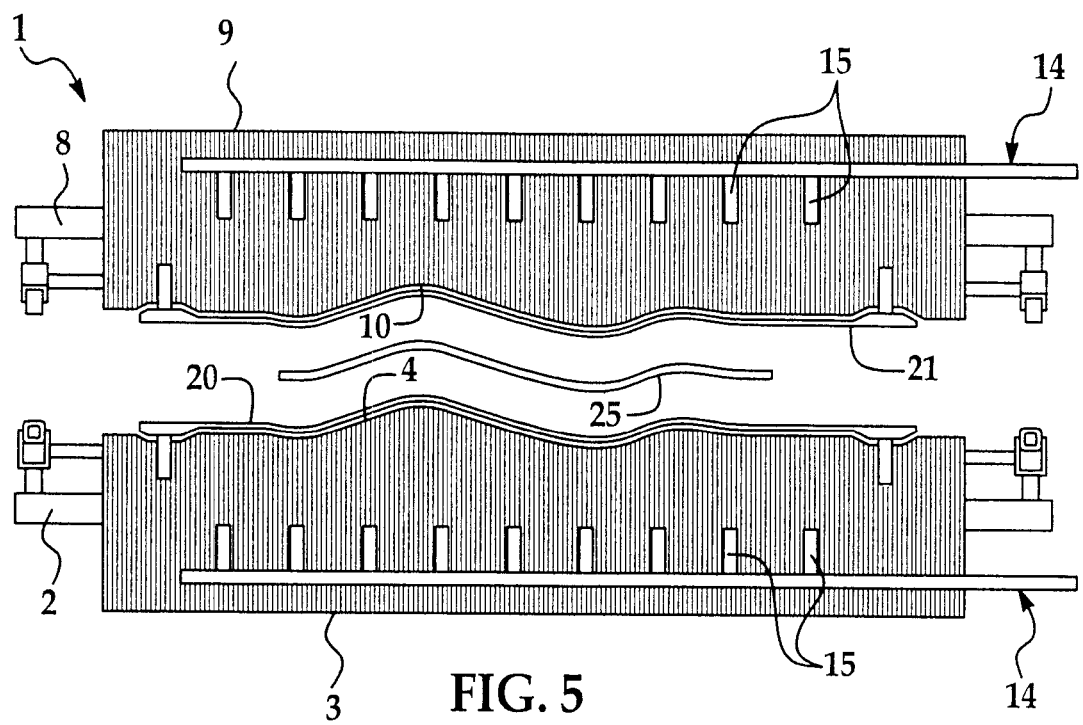
FIG. 5 is a sectional view of the tooling dies, with the tooling dies and die susceptors released from the composite sheet after forming and cooling of the composite sheet.
Figure 6:
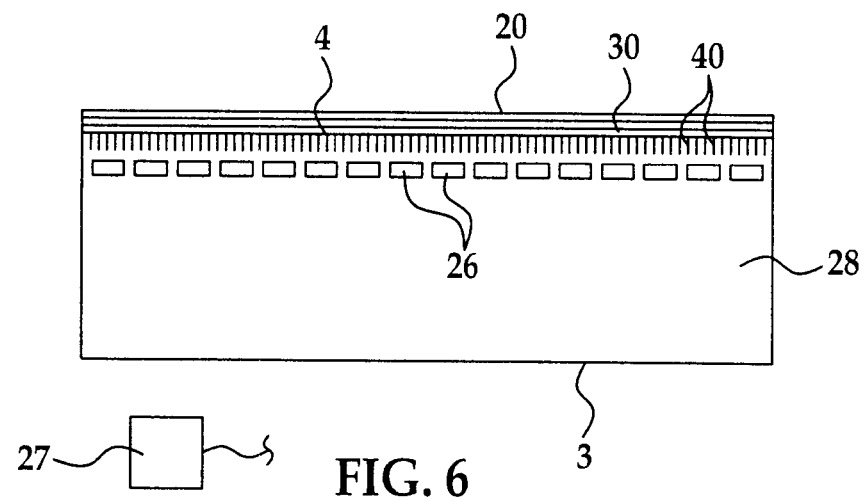
FIG. 6 is a schematic view of a tooling die, more particularly illustrating a die susceptor and die liner provided on the engaging surface of the tooling die and multiple induction coils extending through the tooling die.

As shown in FIG. 6, multiple induction coils 26 may extend through each of the first tooling die 3 (and the second tooling die 9, not shown) to facilitate selective heating of the first tooling die 3 and the second tooling die 9. A thermal control system 27 may be connected to the induction coils 26. A first die susceptor 20 may be thermally coupled to the induction coils 26 of the first tooling die 3. A second die susceptor 21 may be thermally coupled to the induction coils 26 of the second tooling die 9. Each of the first die susceptor 20 and the second die susceptor 21 may be a thermally-conductive material such as, but not limited to, a ferromagnetic material, cobalt, nickel, or compounds thereof. As shown in FIGS. 1-5, the first die susceptor 20 may generally conform to the first contoured die surface 4 and the second die susceptor 21 may generally conform to the second contoured die surface 10.

As shown in FIG. 6, an electrically and thermally insulative coating 30 may be provided on the first contoured die surface 4 of the first tooling die 3, as shown, and on the second contoured die surface 10 of the second tooling die 9 (not shown). The electrically and thermally insulative coating 30 may be, for example, alumina or silicon carbide. The first die susceptor 20 may be provided on the electrically and thermally insulative coating of the first tooling die 3, as shown, and the second die susceptor 21 may be provided on the electrically and thermally insulative coating 30 of the second tooling die 9 (not shown).

Figure 4:
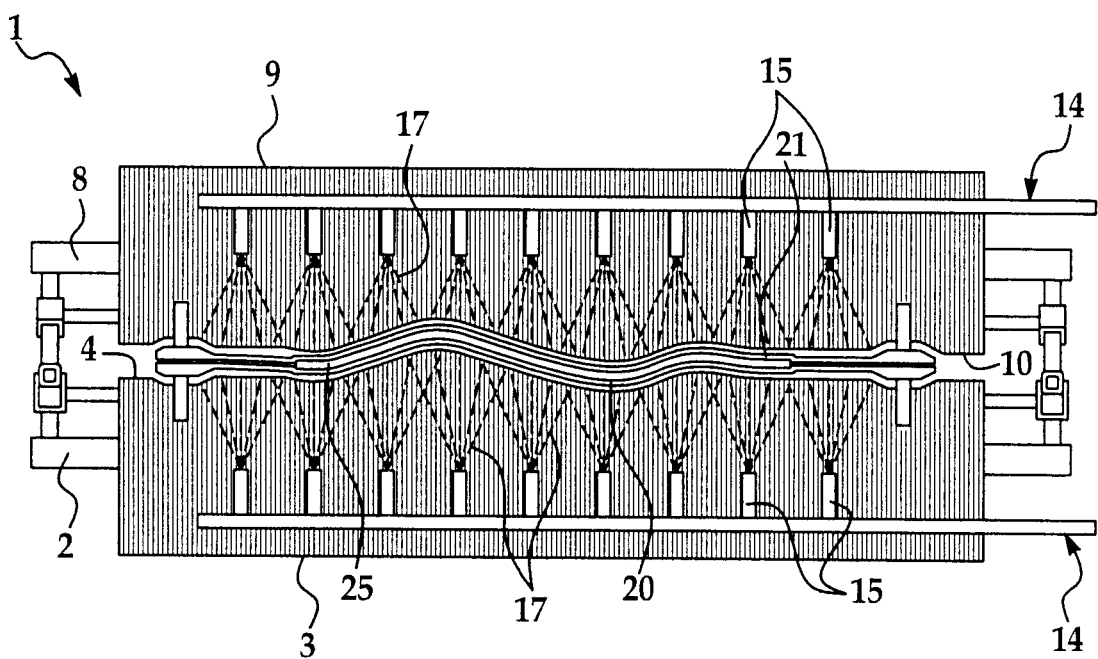
FIG. 4 is a sectional view of the tooling dies, with the tooling dies closed against the die susceptors and composite sheet and a cooling system engaged to cool the tooling dies.

As shown in FIGS. 1-5, a cooling system 14 may be provided in each of the first tooling die 3 and the second tooling die 9. The cooling system 14 may include, for example, coolant conduits 15 which have a selected distribution throughout each of the first tooling die 3 and the second tooling die 9. As shown in FIG. 4, the coolant conduit 15 may be adapted to discharge a cooling medium 17 into the first tooling die 3 or the second tooling die 9. The cooling medium 17 may be a liquid, gas or gas/liquid mixture which may be applied as a mist or aerosol, for example.

Figure 7:
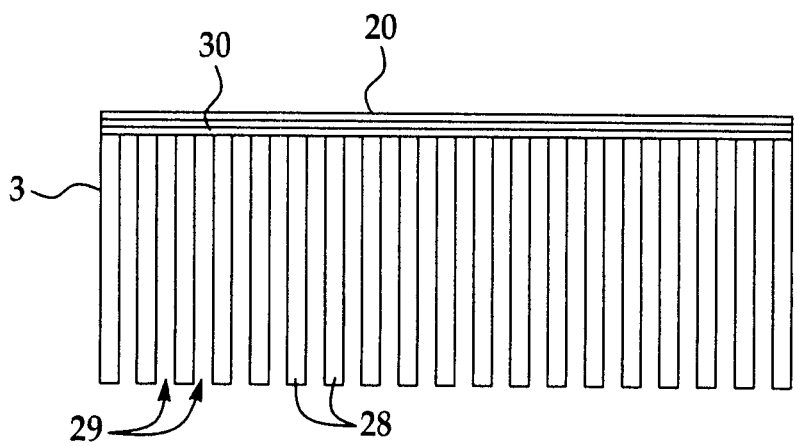
FIG. 7 is a front sectional view of a tooling die, more particularly illustrating multiple induction coils and multiple thermal expansion slots provided in the metal sheet.

Each of the first tooling die 3 and the second tooling die 9 may each include multiple stacked metal sheets 28 such as stainless steel which are trimmed to the appropriate dimensions for the induction coils 26. This is shown in FIGS. 6 and 7. The stacked metal sheets 28 may be oriented in generally perpendicular relationship with respect to the first contoured die surface 4 and the second contoured die surface 10. Each metal sheet 28 may have a thickness of from about 1/16" to about 1/2", for example and preferably 1/8". An air gap 29 may be provided between adjacent stacked metal sheets 28 to facilitate cooling of the first tooling die 3 and the second tooling die 9 (not shown). The stacked metal sheets 28 may be attached to each other using clamps (not shown), fasteners (not shown) and/or other suitable technique known to those skilled in the art. The stacked metal sheets 28 may be selected based on their electrical and thermal properties and may be transparent to the magnetic field. An electrically insulating coating (not shown) may, optionally, be provided on each side of each stacked sheet 28 to prevent flow of electrical current between the stacked metal sheets 28. The insulating coating may be a material such as ceramic, for example, or other high temperature resistant materials. However, if an air gap exists in between the stacked sheets, then no coating would be necessary. Multiple thermal expansion slots 40 may be provided in each stacked sheet 28, as shown in FIG. 6, to facilitate thermal expansion and contraction of the stacked tooling apparatus 1.

Figure 2:
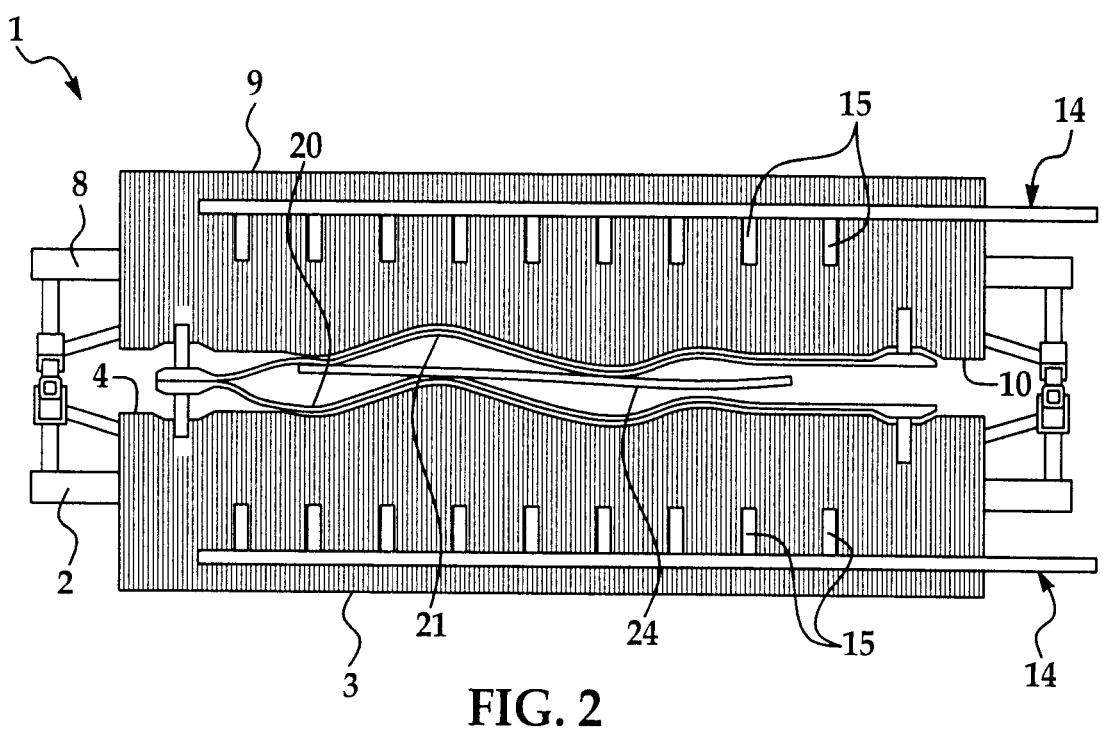
FIG. 2 is a sectional view of a pair of tooling dies, with the molding compounds enclosed between a pair of die susceptors provided on the tooling dies.
Figure 3:
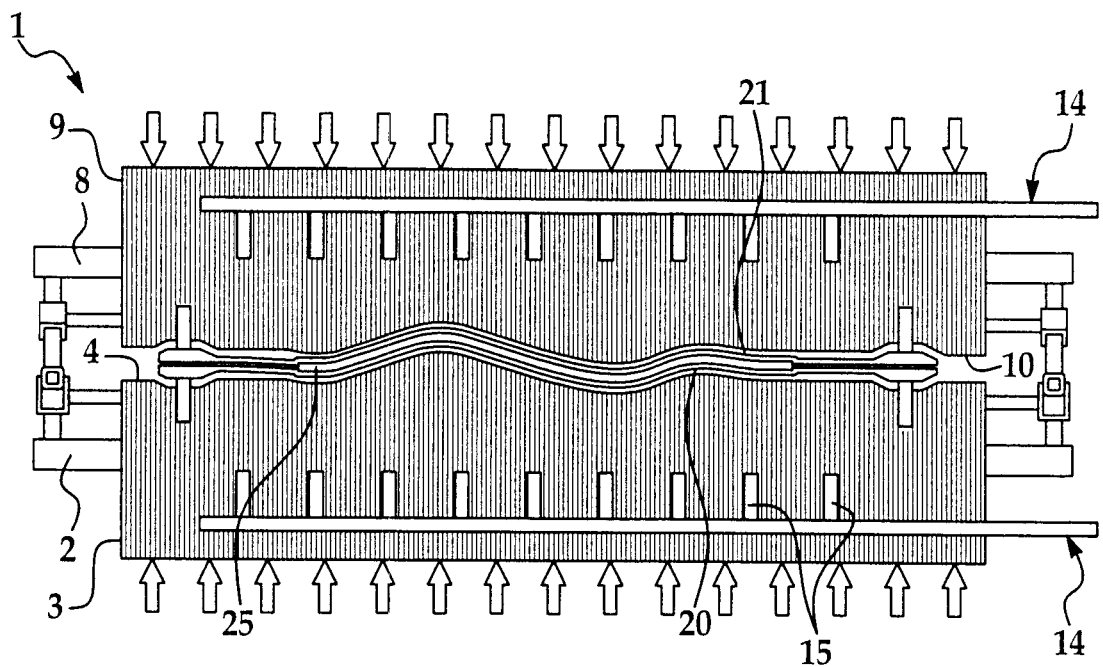
FIG. 3 is a sectional view of the tooling dies, with the tooling dies applying pressure to form and consolidate a composite sheet.

In typical implementation of the composite fabrication method, molding compounds 24 are initially positioned between the first tooling die 3 and the second tooling die 9 of the stacked tooling apparatus 1, as shown in FIG. 1. The first tooling die 3 and the second tooling die 9 are next moved toward each other, as shown in FIG. 2, as the induction coils 26 (FIG. 6) heat the first tooling die 3 and the second tooling die 9 as well as the first die susceptor 20 and the second die susceptor 21. Therefore, as the first tooling die 3 and the second tooling die 9 close toward each other, the first die susceptor 20 and the second die susceptor 21 rapidly heat the molding compounds 24. Thus, the molding compounds 24 which may be thermally molded as the first tooling die 3 and the second tooling die 9 continue to approach and then close against the molding compounds 24, as shown in FIG. 2, forming the molding compounds 24 to the configuration of a composite sheet 25 (shown in FIGS. 3-5) which may be defined by the first contoured surface 4 of the first tooling die 3 and the second contoured surface 10 of the second tooling die 9.

As shown in FIG. 4, the cooling system 14 is next operated to apply the cooling medium 17 to the first tooling die 3 and the second tooling die 9 and to the first die susceptor 20 and the second die susceptor 21. Therefore, the cooling medium 17 actively and rapidly cools the first tooling die 3 and the second tooling die 9 as well as the first die susceptor 20 and the second die susceptor 21, also cooling the composite sheet 25 sandwiched between the first die susceptor 20 and the second die susceptor 21. The composite sheet 25 remains sandwiched between the first tooling die 3 and the second tooling die 9 for a predetermined period of time until complete cooling of the composite sheet 25 has occurred. This allows the molded and consolidated composite sheet 25 to retain the structural shape which is defined by the first contoured surface 4 and the second contoured surface 10 after the first tooling die 3 and the second tooling die 9 are opened, as shown in FIG. 5. The formed and cooled composite sheet 25 is removed from the stacked tooling apparatus 1 without loss of dimensional accuracy or delamination of the composite sheet 25 when it is cooled at an appropriate property-enhancing rate.

Figure 8:
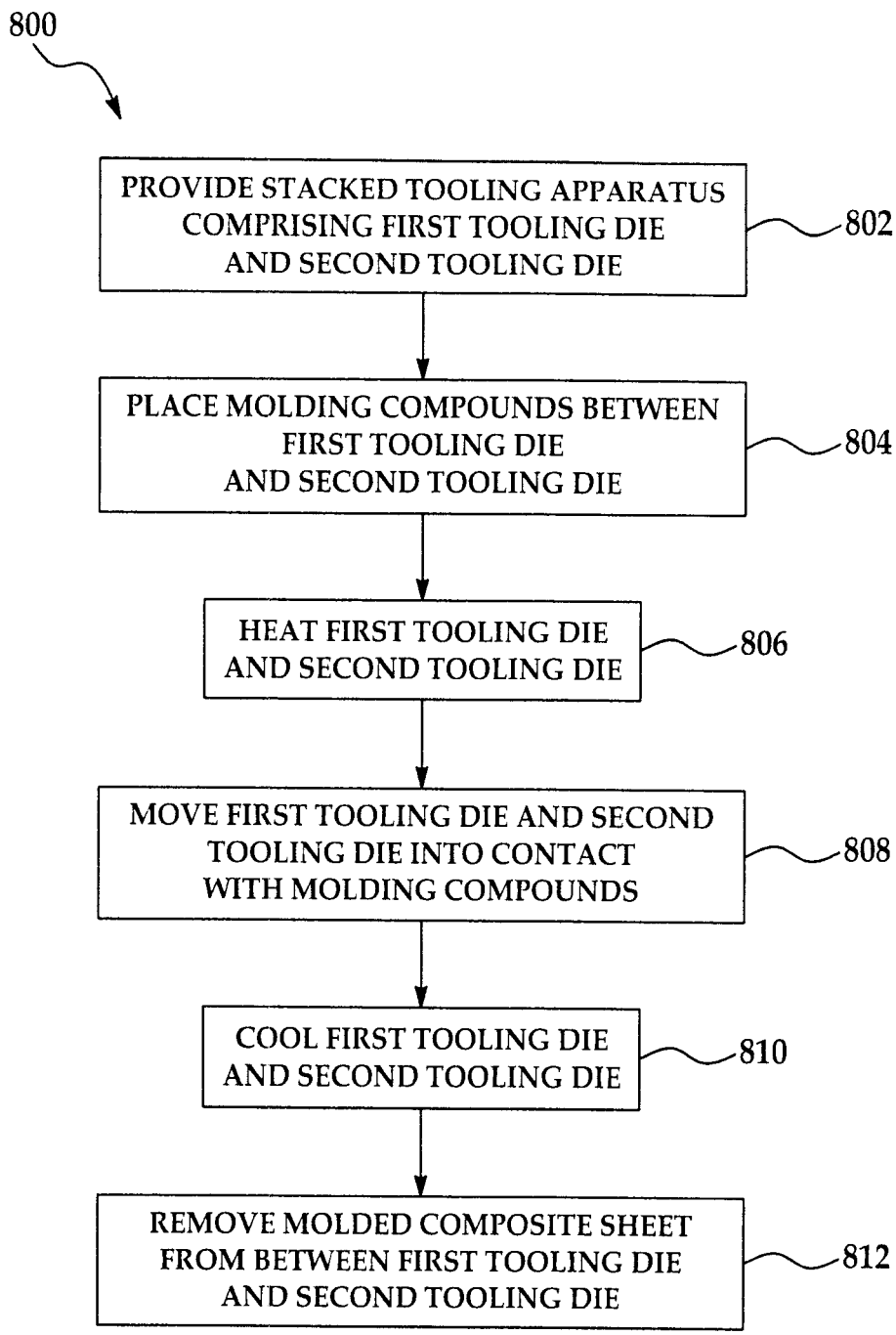
FIG. 8 is a flow diagram which illustrates an exemplary composite fabrication method.

Referring next to FIG. 8, a block diagram 800 which illustrates an exemplary composite fabrication method is shown. In block 802, a stacked tooling apparatus comprising a first tooling die and a second tooling die may be provided. In block 804, molding compounds may be placed between the first tooling die and the second tooling die. In block 806, the first tooling die and the second tooling die may be heated. In block 808, the first tooling die and the second tooling die may be moved into contact with the molding compounds. In block 810, the first tooling die and the second tooling die may be cooled. In block 812, a molded composite sheet is removed from between the first tooling die and the second tooling die.

Figure 9:
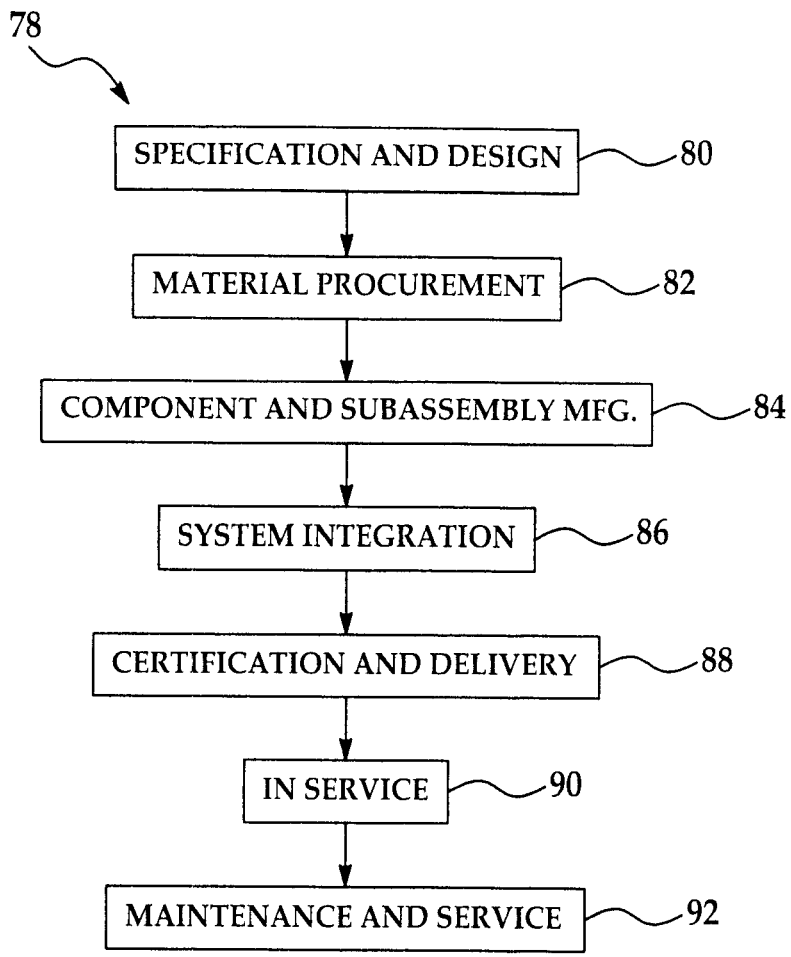
FIG. 9 is a flow diagram of an aircraft production and service methodology.
Figure 10:
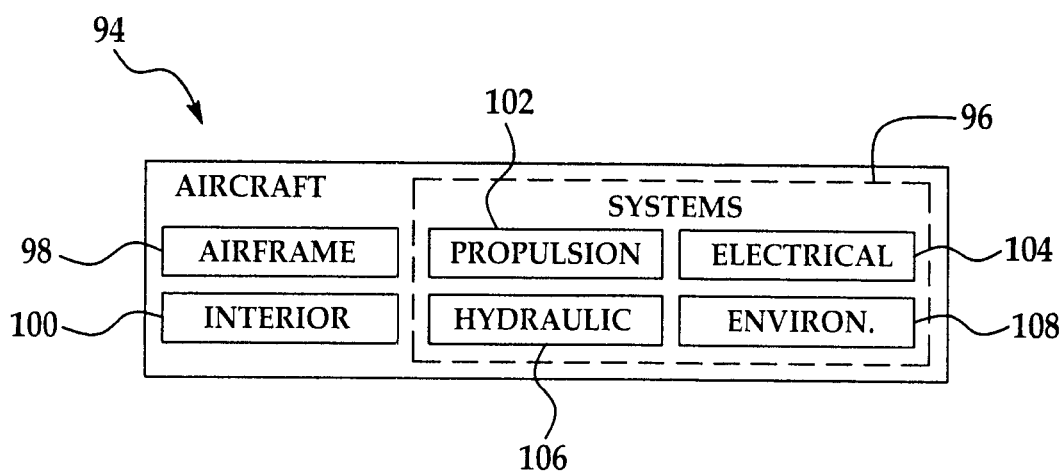
FIG. 10 is a block diagram of an aircraft.

Referring next to FIGS. 9 and 10, embodiments of the disclosure may be used in the context of an aircraft manufacturing and service method 78 as shown in FIG. 9 and an aircraft 94 as shown in FIG. 10. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 is scheduled for routine maintenance and service 90 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 10, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A composite fabrication apparatus, comprising:
   a first tooling die and a second tooling die movable with respect to each other, the first tooling die and the second tooling die comprising a plurality of stacked metal sheets, a plurality of air gaps defined between adjacent stacked metal sheets;
   a first contoured surface provided on said first tooling die and a second contoured surface provided on said second tooling die, the first contoured surface and the second contoured surface configured to impart a curved contour to a composite material;
   a first set of stacked metal sheets positioned with a varying alignment so as to configure the first contoured surface, and a second set of stacked metal sheets positioned with a varying alignment so as to configure the second contoured surface;
   a thermal control system having induction coils disposed in thermal contact with said first tooling die and said second tooling die; and
   a cooling system disposed in thermal contact with said first tooling die and said second tooling die, the cooling system comprising a first conduit having selected distribution in the first set of stacked metal sheets of the first tooling die and a second conduit having selected distribution in the second set of contoured stacked metal sheets of the second tooling die, and the cooling system configured such that the first conduit provides a cooling medium to the first set of stacked metal sheets and the second conduit provides the cooling medium to the second set of stacked metal plates such that the cooling medium passes through the air gaps between each of the first set of stacked metal sheets and the second set of stacked metal sheets.

2. The apparatus of claim 1, wherein each of said plurality of stacked metal sheets has a thickness of from about 1/16 inch to about 1/2 inch.

3. The apparatus of claim 1 further comprising a plurality of thermal expansion slots provided in each of said plurality of stacked metal sheets.

4. The apparatus of claim 1, wherein each of said plurality of stacked metal sheets further comprises an electrically insulating coating.

5. The apparatus of claim 1 further comprising a first die susceptor provided on said first contoured surface of said first tooling die and a second die susceptor provided on said second contoured surface of said second tooling die, the first die susceptor generally conforming to the first contoured surface and the second die susceptor generally conforming to the second contoured surface.

6. The apparatus of claim 5, wherein each of said first die susceptor and said second die susceptor comprises at least one material selected from the group consisting of a ferromagnetic material, cobalt and nickel.

7. The apparatus of claim 1 further comprising an electrically and thermally insulative coating provided on each of said first contoured surface of said first tooling die and said second contoured surface of said second tooling die.

8. A composite fabrication apparatus, comprising:
   a first tooling die and a second tooling die movable with respect to each other so as to mold a composite material;
   wherein each of said first tooling die and said second tooling die comprises a plurality of stacked metal sheets, a plurality of air gaps between said plurality of stacked metal sheets, and a plurality of thermal expansion slots in each of said plurality of stacked metal sheets;
   a first contoured surface provided on said first tooling die and a second contoured surface provided on said second tooling die, the first contoured surface and the second contoured surface configured to impart a curved contour to the composite material, a first set of stacked metal sheets of varying length aligned so as to configure the first contoured surface, and a second set of stacked metal sheets of varying length aligned so as to configure the second contoured surface;
   an electrically and thermally insulative coating provided on each of said first contoured surface of said first tooling die and said second contoured surface of said second tooling die;
   a thermal control system having induction coils disposed in thermal contact with said first tooling die and said second tooling die, the thermal control system configured to apply heat to the composite material;
   a first die susceptor provided on said first contoured surface of said first tooling die and a second die susceptor provided on said second contoured surface of said second tooling die, the first die susceptor generally conforming to the first contoured surface and the second die susceptor generally conforming to the second contoured surface; and
   a cooling system having a plurality of coolant conduits disposed in thermal contact with said first tooling die and said second tooling die, the cooling system comprising a first conduit provided in the first set of stacked metal plates of the first tooling die and a second conduit provided in the second set of contoured stacked metal plates of the second tooling die, and the cooling system configured such that the first conduit provides a cooling medium to the first set of stacked plates and the second conduit provides a cooling medium to the second set of stacked plates, such that the cooling medium passes through the air gaps between the stacked plates in each of the first set of stacked plates and the second set of stacked plates in order to cool the composite material.

9. The apparatus of claim 8, wherein said first tooling die and said second tooling die are hydraulically-actuated in a direction toward and away from each other so as to mold the composite material with the curved contour of the first tooling die and the second tooling die.

10. The apparatus of claim 8, wherein each of said plurality of stacked metal sheets has a thickness of from about 1/16 inch to about 1/2 inch.

11. The apparatus of claim 8, wherein each of said first die susceptor and said second die susceptor is a ferromagnetic material that comprises at least one of cobalt and nickel, and wherein the first die susceptor is positioned on the electrically and thermally insulative coating on the first contoured surface and the second die susceptor is positioned on the electrically and thermally insulative coating on the second contoured surface.

12. The apparatus of claim 1, wherein said first tooling die and said second tooling die are hydraulically-actuated in a direction toward and away from each other so as to mold the composite material with the curved contour of the first tooling die and the second tooling die.

13. The apparatus of claim 4, wherein the electrically insulating coating comprises alumina or silicon carbide.

14. The apparatus of claim 1, wherein the cooling system comprises a plurality of coolant conduits disposed in thermal contact with said first tooling die and said second tooling die.

15. The apparatus of claim 14, wherein the plurality of coolant conduits are configured to discharge a gas cooling medium.

16. The apparatus of claim 14, wherein the plurality of coolant conduits are configured to discharge a liquid cooling medium.

17. The apparatus of claim 14, wherein the plurality of coolant conduits are configured to discharge a gas/liquid mixture cooling medium.

18. The apparatus of claim 1, wherein the cooling medium comprises a gas-liquid aerosol.

19. The apparatus of claim 1, wherein the stacked metal sheets are substantially transparent to a magnetic field.

* * * * *